(12) United States Patent
Kotzin

(10) Patent No.: US 7,046,988 B2
(45) Date of Patent: May 16, 2006

(54) METHOD AND APPARATUS FOR PARTITIONING BILLING CHARGES FOR CALLS HANDLED BY A WIRELESS SUBSCRIBER UNIT

(76) Inventor: Michael D. Kotzin, 2075 Jordan Ter., Buffalo Grove, IL (US) 60089

( * ) Notice: Subject to any disclaimer, the term of this patent is extended or adjusted under 35 U.S.C. 154(b) by 56 days.

(21) Appl. No.: 10/463,783

(22) Filed: Jun. 17, 2003

(65) Prior Publication Data

US 2004/0259525 A1 Dec. 23, 2004

(51) Int. Cl.
H04M 11/00 (2006.01)
H04M 15/00 (2006.01)

(52) U.S. Cl. .................. 455/406; 455/408; 379/114.22

(58) Field of Classification Search ................ 455/406, 455/407, 408, 415, 550.1, 565, 566; 379/114.01, 379/114.03, 114.09, 114.21, 114.22–114.23, 379/114.26, 140

See application file for complete search history.

(56) References Cited

U.S. PATENT DOCUMENTS

| | | | |
|---|---|---|---|
| 4,935,956 A | 6/1990 | Hellwarth et al. | |
| 5,381,467 A * | 1/1995 | Rosinski et al. | 379/121.01 |
| 5,483,445 A | 1/1996 | Pickering | 364/406 |
| 5,602,907 A * | 2/1997 | Hata et al. | 379/114.22 |
| 5,646,984 A * | 7/1997 | Oda | 379/114.22 |
| 5,822,411 A * | 10/1998 | Swale et al. | 379/114.22 |
| 5,940,756 A | 8/1999 | Sibecas et al. | 455/426 |
| 6,115,458 A | 9/2000 | Taskett | 379/144 |
| 6,282,274 B1 * | 8/2001 | Jain et al. | 379/114.26 |
| 6,757,371 B1 * | 6/2004 | Kim et al. | 379/114.22 |
| 6,925,160 B1 * | 8/2005 | Stevens et al. | 379/121.05 |
| 6,956,935 B1 * | 10/2005 | Brown et al. | 379/114.21 |
| 6,977,998 B1 * | 12/2005 | Brown et al. | 379/114.21 |

* cited by examiner

Primary Examiner—Binh K. Tieu
(74) Attorney, Agent, or Firm—Charles W. Bethards

(57) ABSTRACT

A wireless subscriber unit (200) determines (502) a billing mode applicable to a portion of a call, and generates (508, 518) partitioning information for the portion of the call, corresponding to the billing mode. The wireless subscriber unit and a consolidation system (300, 400) cooperate to partition (514, 526) the billing charges between at least two billable entities, based upon the partitioning information. A method of partitioning is also described.

20 Claims, 3 Drawing Sheets

US 7,046,988 B2

METHOD AND APPARATUS FOR PARTITIONING BILLING CHARGES FOR CALLS HANDLED BY A WIRELESS SUBSCRIBER UNIT

FIELD OF THE INVENTION

This invention relates in general to wireless communication systems, and more specifically to a method and apparatus for partitioning billing charges for calls handled by a wireless subscriber unit.

BACKGROUND OF THE INVENTION

It has become a recent trend for users to utilize the same wireless subscriber unit both at work and for personal use. This will become more and more prevalent as seamless mobility between wireless local area networks and wide area wireless systems proliferate. This leads to a significant problem with regard to billing. There currently is no way for the wireless system to discriminate between calls made for business purposes and calls made for personal use. A user's employer generally does not want to pay for usage of a personal nature; nor does the telephone user want to pay airtime charges for calls that are business related.

Thus, what is needed is a method and apparatus for partitioning billing charges for calls handled by a wireless subscriber unit.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENTS

In overview, the present disclosure concerns communication systems that provide service for wireless subscriber units or more specifically for a user thereof operating therein. More particularly, various inventive concepts and principles embodied as a method and apparatus for partitioning billing charges for at least a portion of a call handled by a wireless subscriber unit for use in equipment with such communications systems will be discussed and disclosed. The communications systems of particular interest are those being deployed and developed such as CDMA (Code Division Multiple Access), W-CDMA (Wideband-CDMA), CDMA2000, 2.5G (Generation), 3G, UMTS (Universal Mobile Telecommunications Services) systems and evolutions thereof, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional digital processors, or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such processors, or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Figure 1:
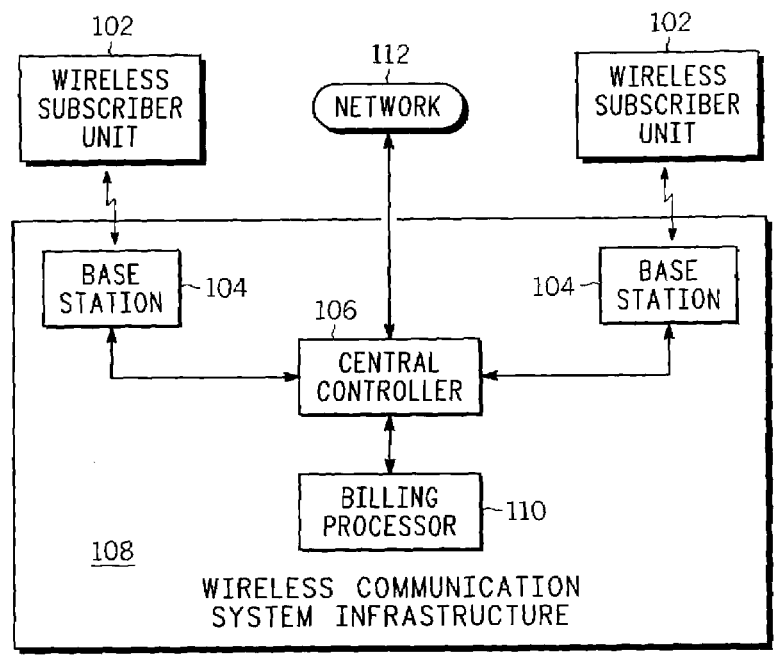
FIG. 1 is an electrical block diagram of a prior-art wireless communication system.

Referring to FIG. 1, an electrical block diagram depicts a prior-art wireless communication system 100 comprising a plurality of wireless subscriber units 102, e.g., cellular telephones, coupled through radio signals or other wireless means to a wireless communication system infrastructure 108. The infrastructure 108 comprises a plurality of base stations 104 coupled to a central controller 106 for controlling the communication system 100 and for providing switching for the communications occurring therein. The controller 106 is preferably also coupled to a network 112, such as the public switched telephone network or the Internet, for providing communications between the network 112 and the wireless subscriber units 102. In addition, the controller 106 is coupled to a billing processor 110 for determining billing charges for calls handled by each of the wireless subscriber units 102.

In the prior art, it is well known for a person to go through a wireless bill and manually partition billing charges for calls into two or more groups based on an entity to be billed, e.g., those charges that are work related and those that are personal. This is usually done after the fact. This procedure leads to errors and inconvenience for the user. It is not known in the prior art to facilitate this process by providing real-time capture of the partitioning information by the handset. Nor is it known to provide any means to support automatically providing this information consolidation service to the user via the cellular billing system. Nor is any means known to manage the capture and routing of this information from the handset to a consolidation means.

Briefly, this disclosure describes some inventive mechanisms that make it easy for an individual to separate charges that are for business or personal use. Essentially, we associate all calls made or received with a particular billing mode, for example, a "personal" mode or a "business" mode. It will be appreciated that in some embodiments there can be a provision for assigning different billing modes to different portions of the same call. For example, a call from a business associate who is also a friend might begin in the "personal" mode and finish in the "business" mode. The capture of the particular mode for a particular call can be done in numerous ways, some of which are described herein below. This associated call information is then forwarded in some way to the switch or billing center. The information can first be logged in the handset and requested subsequently by the billing server, or it can be forwarded call-by-call using an associated side messaging.

In one embodiment, the phone is automatically placed into "business" mode or "personal" mode. One way this can be done is using the phone's real-time clock. During normal work hours, the mode is "business" and at all other times the mode is "personal." The user would have settable "business times." However, this way or approach may not be very accurate.

In another embodiment, the billing mode is determined primarily from a notation in the handset's phone book. For example, if a call is made to a "business number," then the mode for that particular call is "business." If an e-mail message is received from a person's child, then the mode for that data reception is "personal." The user would enter the notations as the phone book is constructed.

In yet another embodiment, the user manually enters the desired billing mode. One way this can be done is to provide buttons or a combination thereof on the keypad—one associated with "business" and the other with "personal."

An even user-friendlier embodiment associates each call with the proper billing mode by querying the user each time a call is made or received. (Of course, this can be used only intermittently when necessary—for example, if the number is not already associated with a billing mode in the handset's phone book.) As for data calls and messages, it should be recognized that there are a myriad of ways to cause the user to similarly capture or indicate which mode is associated with particular received data. For example, the user can be prompted before opening up a message, or actually use a particular key sequence to open the message, preferably involving the billing mode keys.

This disclosure describes two different ways of forwarding the partitioning information to the billing center. In one embodiment, the billing mode of the phone (or, alternatively, number or prompted mode input via user key press) is checked. One of two actions occurs. If the mode is "personal," the phone generates a message that the current call being initiated is of the "personal" type. This message is sent in real time to the wireless communication system infrastructure. Otherwise, a "business" association message is sent. It will be appreciated that in some embodiments more than two billing modes can be defined and utilized, e.g., "personal," "business-x," and "business-y."

In a second embodiment, the mode of the phone is similarly determined. The handset, however, instead of sending a message, logs in a handset usage database the appropriate mode association with the particular call along with additional information for identifying the call (e.g., time, number, etc.). As will be shown later, this log can be subsequently extracted from the handset (perhaps via a request over the air interface or by some other means) and cross-referenced with the call information originally logged and stored in the billing server.

Now consider the corresponding case of a mobile terminated (answered) call. Here a different example can be described. When a call arrives the subscriber will look at his caller ID. If the caller ID indicates to the user that the call is of a business nature, the user presses the "business" button that is associated with business calls. This action can cause the phone to enter the "business" mode and simultaneously answer the call. Alternatively, if a call is received from a personal acquaintance of the user, the user can press the "personal" button corresponding to a personal call. Similar to the call initiation scenario, the subscriber unit either formats and sends a message to the billing server or logs the appropriate association in its usage database.

In an embodiment in which the subscriber unit maintains a usage database as described herein above, the bill partitioning information must be downloaded periodically to the billing system. A request is made to the handset, and the handset simply responds with the data download to the billing server. This can be done over the air interface, a LAN interface or via a hard-wired connection.

When the bill is compiled and post processed, the billing center preferably separates the charges and sends the appropriate bill to the billable entities. For example, the business bill could be sent to the user's company, and the user's personal bill could be sent directly to the user.

Note that, in some embodiments according to the present invention, it is not necessary to modify the existing wireless communication system infrastructure. By changes in the wireless subscriber unit and in the billing server, it is possible to provide this service using existing Java frameworks and systems.

It is also not necessary to rely on the cellular infrastructure network/billing subsystem to perform the partitioning of the bill. The original, unpartitioned bill from the billing server can be made downloadable via, for example, the Internet to a user's computer. The subscriber unit's usage database can also be made available to the user's computer by download via, for example, a Universal Serial Bus (USB) connection. In the user's computer, the bill and usage database information can be post processed to effect the desired call charge partitioning through well-known sorting techniques.

Figure 2:
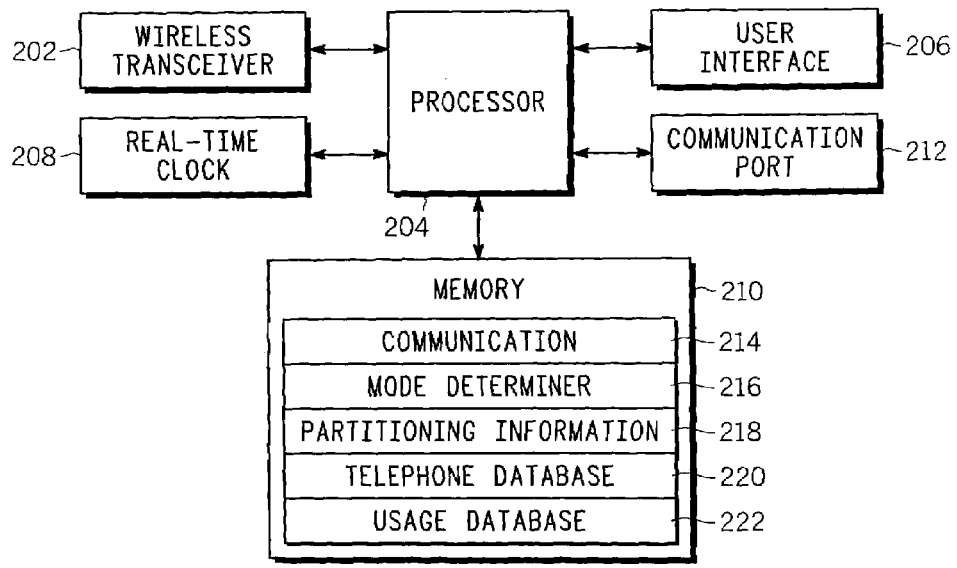
FIG. 2 is a block diagram of an exemplary wireless subscriber unit 200 in accordance with the present invention.

Referring to FIG. 2, an electrical block diagram depicts an exemplary wireless subscriber unit 200 for facilitating a partitioning, between at least two billable entities, of billing charges for at least a portion of a call handled by the wireless subscriber unit 200, in accordance with the present invention. The wireless subscriber unit 200 comprises a conventional wireless transceiver 202 for enabling wireless communication of the call, and a conventional processor 204 coupled to the wireless transceiver 202 for controlling the wireless subscriber unit 200. The wireless subscriber unit 200 further comprises a user interface 206, preferably including a conventional keypad and display, for interfacing with a user of the wireless subscriber unit 200. The wireless subscriber unit 200 further comprises a conventional real-time clock 208 coupled to the processor 204 for generating a time of day. In addition, the wireless subscriber unit 200 includes a communication port 212, e.g., a conventional USB port, coupled to the processor 204 and coupled to a usage database 222 for communicating partitioning information to a consolidation system for partitioning the billing charges. In some embodiments, the wireless transceiver 202 is utilized instead of the communication port 212 for sending the partitioning information to the consolidation system.

The wireless subscriber unit 200 further comprises a memory 210 coupled to the processor 204 for storing information and operating software for programming the processor 204 in accordance with the present invention. The memory 210 comprises a communication program 214 for programming (execution by) the processor 204 to control the communications of the wireless subscriber unit 200 through well-known techniques. The memory 210 further comprises a mode determiner program 216 for programming the processor 204 to determine a billing mode applicable to a portion of a call. In one embodiment, the mode determiner program 216 programs the processor 204 to cooperate with the real-time clock 208 to determine the billing mode by comparing the time of day to a pre-programmed time window. In another embodiment, the mode determiner program 216 programs the processor 204 to determine the billing mode by comparing a telephone number of a device with which the wireless subscriber unit 200 is currently communicating, with a notation associated with the telephone number in a telephone database 220. In yet another embodiment, the mode determiner program 216 programs the processor 204 to determine the billing mode from a desired billing mode manually entered by the user of the wireless subscriber unit 200 through the user interface 206. In still another embodiment, the mode determiner program 216 programs the processor 204 to determine the billing mode by cooperating with the user interface 206 to prompt the user of the wireless subscriber unit 200 to enter a desired billing mode.

The memory 210 also includes a partitioning information program 218 for programming the processor 204 to generate partitioning information for the portion of the call, corresponding to the billing mode, for use in partitioning the billing charges. In one embodiment, the partitioning information program 218 programs the processor 204 to generate a mode identifier for identifying the billing mode, and to forward the mode identifier to a consolidation system in real or near real time while the portion of the call is in progress.

In another embodiment, the partitioning information program 218 programs the processor 204 to generate detailed partitioning information for each call portion.

The detailed partitioning information preferably comprises the mode identifier for identifying the billing mode, and a call-portion identifier, e.g., the start and finish times of the call portion and the telephone number being communicated with, for identifying the portion of the call. The detailed partitioning information is then stored in the usage database 222 of the wireless subscriber unit 200. In addition, the partitioning information program 218 programs the processor 204 to transfer the detailed partitioning information from the usage database to the consolidation system some time after storing the detailed partitioning information, e.g., upon request from a billing consolidation system. In addition, the memory 210 includes the telephone database 220 for storing telephone numbers, and the usage database 222 for storing the detailed partitioning information.

It will be appreciated that a call that has a single, consistent, billing mode, e.g. "business" throughout may, but is not required to be, divided into more than one portion. Multiple portions are useful when the billing mode changes during the call, e.g., first portion is "personal" and second portion is "business." It will be further appreciated that, in embodiments that allow the user to select the billing mode, the billing mode can be changed as many times as desired during a single call.

Figure 3:
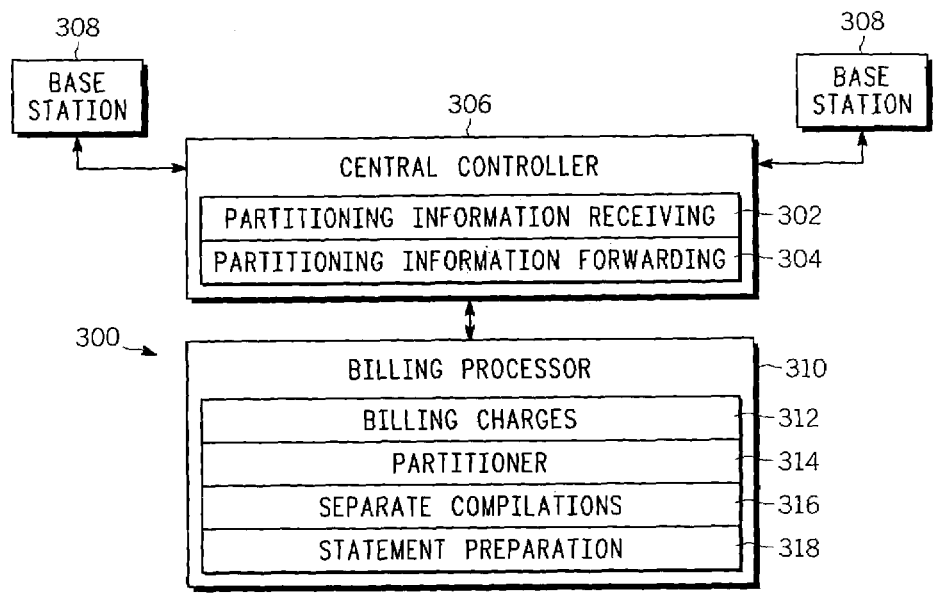
FIG. 3 includes al block diagram of a first exemplary consolidation system 300 fully integrated into a wireless communication system infrastructure in accordance with the present invention.

Referring to FIG. 3, an electrical block diagram depicts a first exemplary system including a wireless communication system infrastructure and consolidation system 300 in accordance with the present invention. The consolidation system 300 operates in a wireless communication system infrastructure for supporting the wireless subscriber unit 200, where the wireless communication system infrastructure comprises a central controller 306 along with the plurality of conventional base stations 308. The central controller 306 is similar to the central controller 106, the essential difference being that the central controller 306 comprises additional software programming or instructions. The additional software programming includes a partitioning information receiving program 302 for programming the central controller 306 to receive partitioning information, e.g., a billing mode identifier, through well-known side-messaging techniques, from the wireless subscriber unit 200 during a portion of the call to which the partitioning information applies. In addition, the central controller 306 includes a partitioning information forwarding program 304 for programming the central controller 306 to forward the partitioning information to the consolidation system 300 comprising an inventive billing processor 310.

The billing processor 310 is similar to the billing processor 110 and is arranged to exchange messages with the central controller 306 and particularly to receive billing information therefrom. The consolidation system 300 or billing processor 310 is novel in that is receives partitioning information from the wireless subscriber unit by way of the central controller, etc. either during or in conjunction with an ongoing call or portion thereof when the subscriber device or unit chooses to download the partitioning information to the billing processor, or upon request from the billing processor to the subscriber unit. A further unique and advantageous difference with the billing processor 110 is that the billing processor 310 is arranged and comprises and is executing additional software instructions or programs in the form of a partitioner 314 for programming the billing processor 310 to process the partitioning information to partition the normal billing charges 312 for the portion of the call between at least two billable entities, and to store separate compilations 316 of billing charges for each of the at least two billable entities, based upon the partitioning information. In addition, the billing processor 310 includes a statement preparation program 318 for programming the billing processor 310 to periodically prepare at least two billing statements corresponding to the at least two billable entities, or in general a statement for each billable entity, from the separate compilations 316 of billing charges.

It will be appreciated that, while the embodiment of the consolidation system 300 described herein above receives and processes the partitioning information in real time, an alternative embodiment of the consolidation system 300 can batch-process the partitioning information. In the alternative embodiment, the wireless subscriber unit 200 stores in the usage database 222 an entry of detailed partitioning information for each call portion. The detailed partitioning information includes the billing mode identifier and a call-portion identifier, e.g., the start and finish times of the call portion and the telephone number being communicated with, for identifying the call portion. The detailed partitioning information then can be periodically downloaded to the consolidation system 300 over the air, through a local area network, or via a dial-up connection, voluntarily by the subscriber unit or upon request from the consolidation system.

Figure 4:
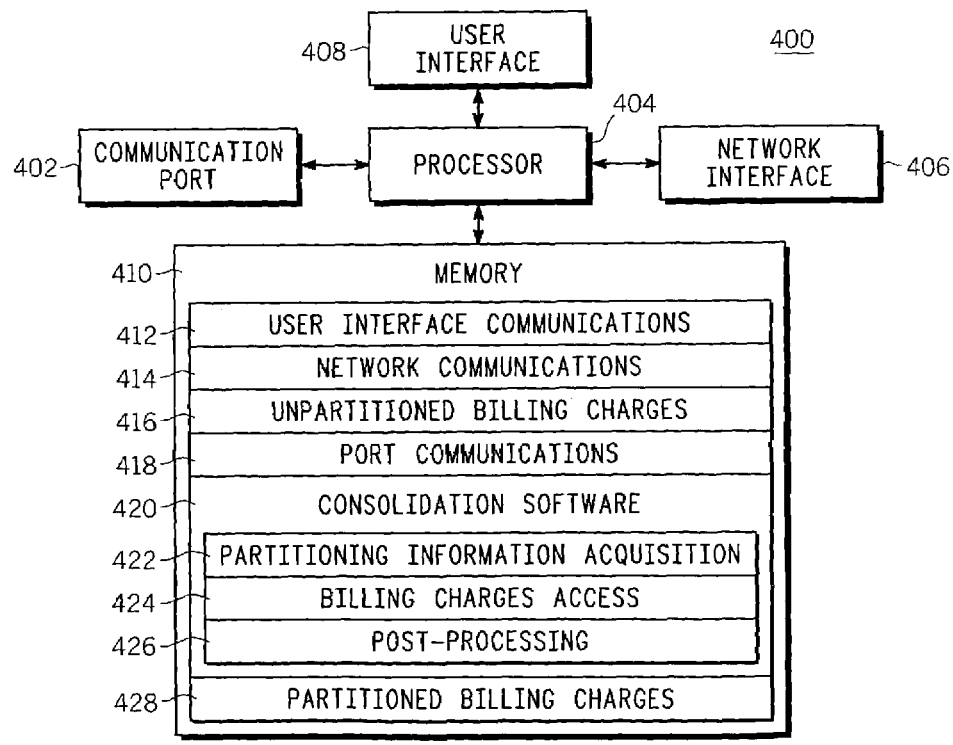
FIG. 4 is a block diagram of a second exemplary consolidation system 400 in accordance with the present invention.

Referring to FIG. 4, an electrical block diagram depicts a second exemplary consolidation system 400 in accordance with the present invention. The consolidation system 400 preferably operates as a stand-alone unit independent of the wireless communication system infrastructure. The consolidation system 400 comprises a communication port 402, e.g., a conventional Universal Serial Bus (USB), coupled to a conventional processor 404. The consolidation system 400 further comprises a network interface, e.g., a conventional modem, coupled to the processor 404. The consolidation system 400 also includes a user interface 408, e.g., a conventional display, mouse, and keyboard, coupled to the processor 404. In addition, the consolidation system 400 includes a conventional memory 410 coupled to the processor 404 for storing variables and software for programming the processor 404 in accordance with the present invention. In one embodiment, the hardware and a portion of the software of the consolidation system 400 are the hardware and software of a conventional personal computer.

The memory 410 comprises a conventional user interface communications program 412 for programming the processor to control and interact with the user interface 408. In addition, the memory 410 preferably includes a network communications program 414, e.g., a conventional browser, for programming the processor 404 to cooperate with the network interface 406 to access a network, such as the Internet. The memory 410 further comprises a file for storing unpartitioned billing charges 416—a compilation of billing charges for billable calls handled by the wireless subscriber unit 200 during a predetermined billing period, such as one month. The user of the consolidation system 400 preferably utilizes the network communications program 414 to periodically, e.g., once per month, download the unpartitioned billing charges 416 from a billing server of the wireless communication system through the network interface 406, e.g., over the Internet. The memory 410 also includes a port communications program 418 for programming the processor 404 to control the communication port 402 to communicate with the communication port 212 of the wireless subscriber unit 200 for downloading information therefrom.

The memory further comprises a consolidation software program 420, for programming the processor 404 to act as a consolidation system for partitioning, between at least two billable entities, billing charges for calls handled by the wireless subscriber unit 200, in accordance with the present invention. The consolidation software 420 includes a partitioning information acquisition program 422 for programming the processor 404 to control the communication port 402 to communicate with the wireless subscriber unit 200 to obtain the detailed partitioning information stored in the wireless subscriber unit 200. The wireless subscriber unit or the processor may initiate this communications. The consolidation software 420 also includes a billing charges access program 424 for programming the processor 404 to access the file comprising the unpartitioned billing charges 416. In addition, the consolidation software 420 includes a post-processing program 426 for programming the processor 404 to post-process the compilation of unpartitioned billing charges 416 in accordance with the detailed partitioning information to partition the billing charges between the at least two billable entities. The memory 410 further comprises a file for storing partitioned billing charges 428 produced by the post-processing program 426. The user can then display or print out the partitioned billing charges 428 through the user interface 408 using well-known procedures.

Figure 5:
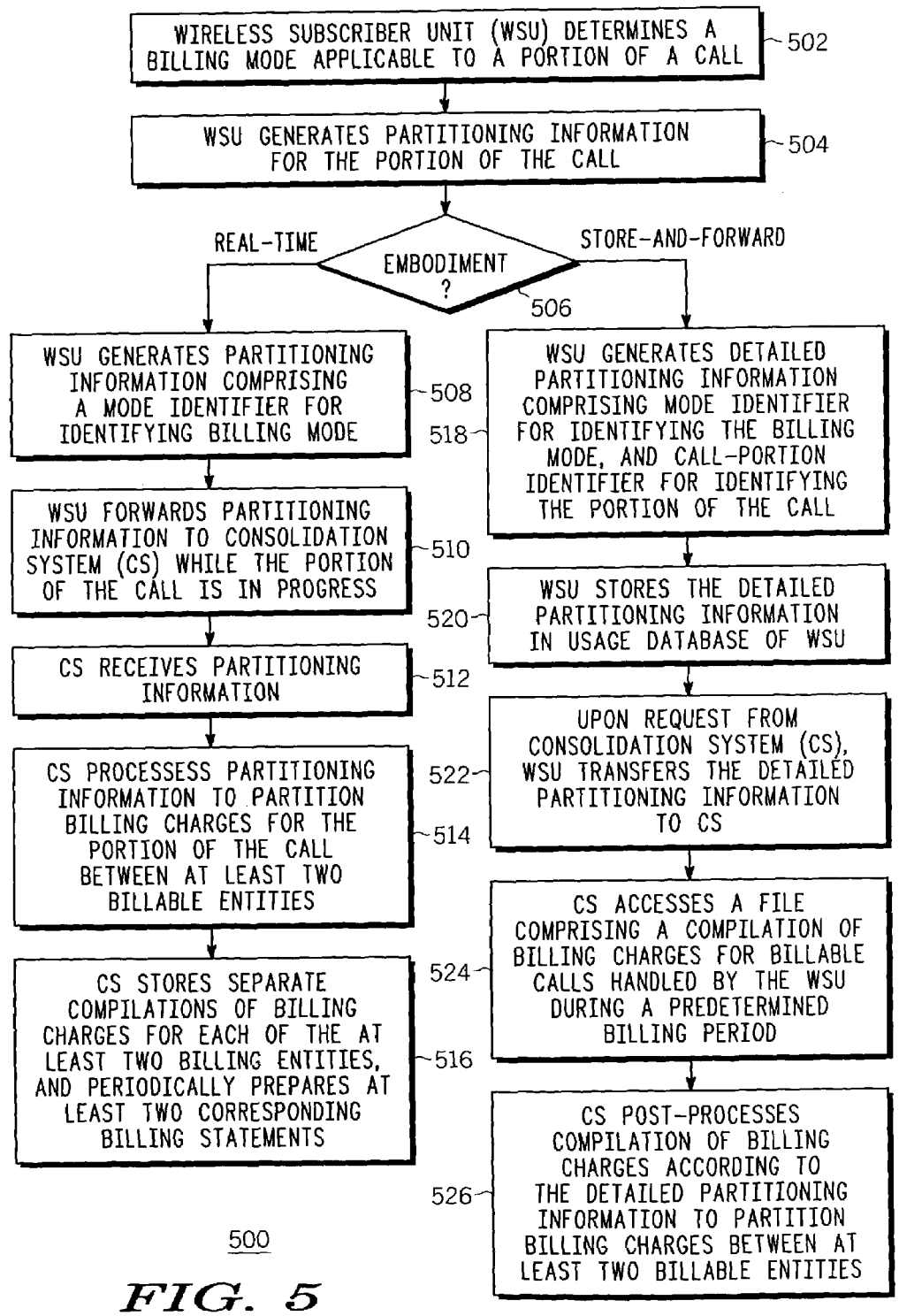
FIG. 5 is an exemplary flow diagram depicting operation of first and second embodiments of the wireless subscriber unit 200 with the first and second consolidation systems 300, 400.

Referring to FIG. 5, an exemplary flow diagram 500 depicts operation of first and second embodiments of the wireless subscriber unit 200 with the first and second consolidation systems 300, 400. The first embodiment is a real-time method embodiment, while the second embodiment is a store-and-forward method embodiment. It will be appreciated that while the methods are described here in an exemplary fashion as operating on or in conjunction with the subscriber unit 200 and consolidation systems 300, 400, these methods may be advantageously practiced with other apparatus or equipments. The flow begins with the wireless subscriber unit 200 processing a portion of a call and determining 502 a billing mode applicable to the portion of the call. The wireless subscriber unit 200 then generates 504 partitioning information for the portion of the call. When in step 506 the embodiment is the real-time embodiment, the wireless subscriber unit 200 then generates 508 partitioning information comprising a mode identifier for identifying the billing mode. The wireless subscriber unit 200 then forwards 510 the petitioning information to the consolidation system 300 while the portion of the call is in progress. The consolidation system 300 receives 512 the partitioning information, preferably as forwarded from the central controller. The consolidation system 300, specifically billing processor 310, then processes 514 the partitioning information to partition the billing charges between the at least two billing entities. The consolidation system 300 or billing processor 310 then stores 516 separate compilations of billing charges for each of the at least two billing entities, and periodically prepares at least two corresponding billing statements for the at least two billing entities.

If, on the other hand, at step 506 the embodiment is store-and-forward, then the wireless subscriber unit 200 generates 518, detailed partitioning information comprising the mode identifier for identifying the billing mode, and a call-portion identifier for identifying the portion of the call. The wireless subscriber unit 200 then stores 520 the detailed partitioning information in the usage database 222 of the wireless subscriber unit 200. Upon request from the consolidation system 400, the wireless subscriber unit 200 transfers 522 the detailed partitioning information to the consolidation system 400. The consolidation system 400 then accesses 524 a file comprising a compilation of unpartitioned billing charges 416 for billable calls handled by the wireless subscriber unit 200 during a predetermined billing period. The consolidation system 400 then post-processes 526 the compilation of unpartitioned billing charges 416 according to the detailed partitioning information to partition the billing charges between the at least two billable entities.

Thus, it should be clear from the preceding disclosure that the present invention provides a method and apparatus for partitioning billing charges for at least a portion of a call handled by a wireless subscriber unit. The method and apparatus advantageously is suited to implementation both integral to a wireless communication system and in a stand-alone form.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for partitioning, between at least two billable entities, billing charges for at least a portion of a call handled by a wireless subscriber unit, the method comprising:
   determining a billing mode applicable to the portion of the call;
   generating partitioning information for the portion of the call, corresponding to the billing mode; and
   partitioning, after determination of the billing charges, existing billing charges associated with the call between the at least two billable entities after completion of the call, based upon the partitioning information, the partitioning information obtained separately from the existing billing charges.

2. The method of claim 1, wherein determining the billing mode comprises comparing a time of day to a pre-programmed time window.

3. The method of claim 1, wherein determining the billing mode comprises comparing a telephone number of a device with which the wireless subscriber unit is currently communicating, with a notation associated with said telephone number in a telephone database of the wireless subscriber unit.

4. The method of claim 1, wherein determining the billing mode comprises manually entering, by a user of the wireless subscriber unit, a desired billing mode.

5. The method of claim 1, wherein determining the billing mode comprises prompting a user of the wireless subscriber unit to enter a desired billing mode.

6. The method of claim 1,
   wherein generating the partitioning information for the portion of the call comprises generating a mode identifier for identifying the billing mode, and
   wherein the method further comprises forwarding the mode identifier to a consolidation system while the portion of the call is in progress.

7. The method of claim 1,
   wherein generating the partitioning information for the portion of the call comprises:
   generating a mode identifier for identifying the billing mode;
   generating a call-portion identifier for identifying the portion of the call; and
   storing the mode identifier and the call-portion identifier in a usage database of the wireless subscriber unit, and
   wherein the method further comprises transferring the mode identifier and the call-portion identifier from the usage database to a consolidation system some time after storing the mode identifier and the call-portion identifier.

8. A wireless subscriber unit for facilitating a partitioning, between at least two billable entities, of billing charges for at least a portion of a call handled by the wireless subscriber unit, comprising:
   a wireless transceiver for enabling wireless communication of the call;
   a processor coupled to the wireless transceiver for controlling the wireless subscriber unit; and
   a user interface coupled to the processor for interfacing with a user of the wireless subscriber unit,
   wherein the processor is programmed to:
   determine a billing mode applicable to the portion of the call; and
   generate partitioning information for the portion of the call, corresponding to the billing mode, for use in partitioning existing billing charges associated with the call, the partitioning of the existing billing charges occurring after completion of the call based on the partitioning information and separately obtained existing billing charges.

9. The wireless subscriber unit of claim 8, further comprising a real-time clock coupled to the processor for generating a time of day,
   wherein the processor is further programmed to cooperate with the real-time clock to determine the billing mode by comparing the time of day to a pre-programed time window.

10. The wireless subscriber unit of claim 8, further comprising
    a telephone data base coupled to the processor for storing telephone numbers, and
    wherein the processor is further programmed to determine the billing mode by comparing a telephone number of a device with which the wireless subscriber unit is currently communicating, with a notation associated with said telephone number in the telephone database.

11. The wireless subscriber unit of claim 8,
    wherein the processor is further programmed to determine the billing mode from a desired billing mode manually entered by the user of the wireless subscriber unit through the user interface.

12. The wireless subscriber unit of claim 8,
    wherein the processor is further programmed to determine the billing mode by cooperating with the user interface to prompt the user of the wireless subscriber unit to enter a desired billing mode.

13. The wireless subscriber unit of claim 8, wherein the processor is further programmed to:
    generate a mode identifier for identifying the billing mode, and
    forward the mode identifier to a consolidation system while the portion of the call is in progress.

14. The wireless subscriber unit of claim 8, further comprising
    a usage database for storing detailed partitioning information,
    wherein the processor is further programmed to:
    generate the detailed partitioning information comprising a mode identifier for identifying the billing mode and a call-portion identifier for identifying the portion of the call; and
    store the detailed partitioning information in the usage database of the wireless subscriber unit; and
    transfer the detailed partitioning information from the usage database to a consolidation system some time after storing the detailed partitioning information.

15. The wireless subscriber unit of claim 14, further comprising
    a communication port coupled to the processor and coupled to the usage database for communicating the detailed partitioning information to the consolidation system for partitioning the billing charges.

16. A consolidation system for partitioning, between at least two billable entities, billing charges for calls handled by a wireless subscriber unit operating within a wireless communication system infrastructure comprising a central controller, the consolidation system comprising:
    a billing processor, arranged and executing software to:
    receive partitioning information from the wireless subscriber unit upon completion of the call and separately receive billing charges for a call upon completion of the call, the partitioning information corresponding to a portion of the call; and process the partitioning information and the billing charges as separately received to partition the billing charges for the portion of the call between the at least two billable entities.

17. The consolidation system of claim 16, wherein the billing processor is further programmed to: store separate compilations of billing charges for each of the at least two billable entities, based upon the partitioning information; and periodically prepare at least two billing statements corresponding to the at least two billable entities, from the separate compilations of billing charges.

18. The consolidation system of claim 16, wherein the billing processor is further programmed to:

execute software to receive batch partitioning information for a plurality of calls and batch-process the batch partitioning information to partition the billing charges between the at least two billable entities.

19. A software program that, when installed and executing on a processing system, causes the processing system to act as a consolidation system for partitioning, between at least two billable entities, billing charges for calls handled by a wireless subscriber unit, wherein the processing system is caused to:

communicate, upon completion of one or more of the calls with the wireless subscriber unit to obtain detailed partitioning information associated with the one or more calls, the detailed partitioning information stored in the wireless subscriber unit;

access a file comprising a compilation of billing charges without the detailed partitioning information for billable calls handled by the wireless subscriber unit during a predetermined billing period; and post-process the compilation of billing charges in accordance with the detailed partitioning information to partition the billing charges between the at least two billable entities.

20. The software program of claim 19, wherein the processing system initiates communications with the wireless subscriber unit and the wireless subscriber unit then downloads the detailed partitioning information to the processing system.

* * * * *